United States Patent
Oroskar et al.

(10) Patent No.: US 10,171,215 B1
(45) Date of Patent: Jan. 1, 2019

(54) SEGREGATING UES AMONG CARRIERS TO HELP FACILITATE OPERATION IN LEAN-CARRIER MODE

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/432,014

(22) Filed: Feb. 14, 2017

(51) Int. Cl.
| | |
|---|---|
| *H04W 76/28* | (2018.01) |
| *H04W 76/27* | (2018.01) |
| *H04W 24/08* | (2009.01) |
| *H04W 36/38* | (2009.01) |
| *H04W 48/18* | (2009.01) |
| *H04W 72/04* | (2009.01) |
| *H04L 5/00* | (2006.01) |
| *H04W 72/12* | (2009.01) |
| *H04W 88/10* | (2009.01) |

(52) U.S. Cl.
CPC ........... *H04L 5/0048* (2013.01); *H04W 24/08* (2013.01); *H04W 36/38* (2013.01); *H04W 48/18* (2013.01); *H04W 72/042* (2013.01); *H04W 72/0453* (2013.01); *H04W 72/1205* (2013.01); *H04W 76/27* (2018.02); *H04W 76/28* (2018.02); *H04W 88/10* (2013.01)

(58) Field of Classification Search
CPC ..... H04W 76/28; H04W 76/27; H04W 24/08; H04W 36/38; H04W 48/18; H04W 72/042; H04W 72/0453
See application file for complete search history.

(56) References Cited

U.S. PATENT DOCUMENTS

| | | | |
|---|---|---|---|
| 9,300,373 B2 | 3/2016 | Lindoff et al. | |
| 2009/0010369 A1* | 1/2009 | Yoshida | H04B 7/0417 375/349 |
| 2009/0154419 A1* | 6/2009 | Yoshida | H04L 5/0023 370/330 |
| 2015/0085833 A1 | 3/2015 | Han et al. | |
| 2017/0295587 A1* | 10/2017 | Lam | H04W 72/10 |

OTHER PUBLICATIONS

Roth et al., "A Leaner Carrier for the New 5G Air Interface", IEEE (2015).
Hoymann et al., "A Lean Carrier for LTE", IEEE Communications Magazine, pp. 74-80, (2013).

* cited by examiner

Primary Examiner — Ronald B Abelson (57) ABSTRACT

Disclosed are methods and systems for segregating user equipment devices (UEs) among carriers to help facilitate operation in lean-carrier mode in which a base station (BS) engages in a reduced extent of reference signaling on a particular carrier. In practice, the BS may operate in the lean-carrier mode when bearer data is not being communicated on the particular carrier. Given this arrangement, the BS may identify one or more UEs, of a plurality of UEs served by the BS, based on each UE communicating bearer data less frequently than a threshold frequency of bearer data communication. And the BS may serve just the identified UEs on the particular carrier, thereby increasing a probability of the BS operating in the lean-carrier mode.

17 Claims, 8 Drawing Sheets

SEGREGATING UES AMONG CARRIERS TO HELP FACILITATE OPERATION IN LEAN-CARRIER MODE

BACKGROUND

A typical cellular wireless network includes a number of base stations (BSs) each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station (BS) may be coupled with network infrastructure that provides connectivity with one or more transport networks, such as the public switched telephone network (PSTN) and/or the Internet for instance. With this arrangement, a UE within coverage of the network may engage in air interface communication with a BS and may thereby communicate via the BS with various remote network entities or with other UEs served by the BS.

Further, a cellular wireless network may operate in accordance with a particular air interface protocol (radio access technology), with communications from the BSs to UEs defining a downlink or forward link and communications from the UEs to the BSs defining an uplink or reverse link. Examples of existing air interface protocols include, without limitation, Long Term Evolution (LTE) (using Orthogonal Frequency Division Multiple Access (OFDMA) and Single Carrier Frequency Division Multiple Access (SC-FDMA)), Code Division Multiple Access (CDMA) (e.g., 1×RTT and 1×EV-DO), Global System for Mobile Communications (GSM), IEEE 802.11 (WIFI), BLUETOOTH, among others. Each protocol may define its own procedures for registration of UEs, initiation of communications, handover between coverage areas, and other functions related to air interface communication.

In accordance with a recent version of the LTE standard of the Universal Mobile Telecommunications System (UMTS), for instance, each coverage area of a BS may operate on one or more carriers spanning 1.4 MHz, 3 MHz, 5 MHz, 10 MHz, 15 MHz, or 20 MHz, with each carrier being divided primarily into subcarriers spaced apart from each other by 15 kHz. Further, the air interface is divided over time into a continuum of 10-millisecond frames, with each frame being further divided into ten 1-millisecond subframes or transmission time intervals (TTIs) that are in turn each divided into two 0.5-millisecond segments. In each 0.5 millisecond segment or in each 1 millisecond TTI, the air interface is then considered to define a number of 12-subcarrier wide "resource blocks" spanning the frequency bandwidth (i.e., as many as would fit in the given frequency bandwidth). In addition, each resource block is divided over time into symbol segments of 67 μs each, with each symbol segment spanning the 12-subcarriers of the resource block and thus supporting transmission of symbols in "resource elements."

The LTE air interface then defines various channels made up of certain ones of these resource blocks and resource elements. For instance, on the downlink, certain resource elements across the bandwidth are reserved to define a physical downlink control channel (PDCCH) for carrying control signaling from the BS to UEs, and other resource elements are reserved to define a physical downlink shared channel (PDSCH) for carrying bearer data transmissions from the BS to UEs. Likewise, on the uplink, certain resource elements across the bandwidth are reserved to define a physical uplink control channel (PUCCH) for carrying control signaling from UEs to the BS, and other resource elements are reserved to define a physical uplink shared channel (PUSCH) for carrying bearer data transmissions from UEs to the BS.

In a system arranged as described above, when a UE enters into coverage of a BS, the UE may engage in attach signaling with the BS, by which the UE would register to be served by the BS on a particular carrier. Through the attach process and/or subsequently, the BS and supporting LTE network infrastructure may establish for the UE one or more bearers, essentially defining logical tunnels for carrying bearer data between the UE and a transport network such as the Internet.

Once attached with the BS, a UE may then operate in a "connected" mode in which the BS may schedule data communication to and from the UE on the UE's established bearer(s). In particular, when a UE has bearer data to transmit to the BS, the UE may transmit a scheduling request to the BS, and the BS may responsively allocate one or more upcoming resource blocks on the PUSCH to carry that bearer data and transmit on the PDCCH to the UE a downlink control information (DCI) message that directs the UE to transmit the bearer data in the allocated resource blocks, and the UE may then do so. Likewise, when the BS has bearer data to transmit to the UE, the BS may allocate PDSCH resource blocks to carry that bearer data and may transmit on the PDCCH to the UE a DCI message that directs the UE to receive the bearer data in the allocated resource blocks, and the BS may thus transmit the bearer data in the allocated resource blocks to the UE. LTE also supports uplink control signaling on the PUCCH using uplink control information (UCI) messages. UCI messages can carry scheduling requests from UEs, requesting the BS to allocate PUSCH resource blocks for uplink bearer data communication.

In addition, certain air interface resources are reserved for reference signaling, so that a BS can broadcast a reference signal useable by UEs for detection and evaluation of coverage, among other options. By way of example, LTE specifies, among other reference signals, a cell-specific reference signal (CRS) that UEs can detect for searching and acquiring BSs, measuring downlink quality, and estimating downlink channels for coherent demodulation and detection of downlink signals. The CRS is allocated specific resource elements in each resource block, and in conventional LTE operation referred to herein as a "legacy mode", the CRS is transmitted on each allocated resource element in every downlink resource block during every subframe.

In this regard, the specific resource elements allocated to the CRS in each resource block—usually eight—form a pattern within the array of resource elements of each resource block, with fixed offsets of resource elements in time and subcarrier frequency. While the offset pattern is often the same across a wireless network, the pattern used by neighboring BSs on their respective downlinks may be shifted up or down relative to each other by one subcarrier frequency to avoid interference that would otherwise occur from the CRS being transmitted on the same subcarrier frequency at the same time.

Unfortunately, however, such shifting of the pattern may lead to other interference problems. Specifically, the resource elements carrying a CRS in downlink resource blocks transmitted from one BS may interfere with resource elements carrying bearer data in downlink resource blocks transmitted from a neighboring BS. Consequently, downlink data rates may decrease and overall network performance may suffer.

Overview

Given the various interference issues that may arise during BS operation in legacy mode, the wireless communication industry has introduced a lean-carrier mode. In the lean-carrier mode, a BS may engage in reduced reference signaling on a carrier compared to the extent to which the BS engages in reference signaling on the carrier when it operates in the legacy mode. Consequently, BS operation in lean-carrier mode may reduce interference and may also provide other advantages, such as reduced network energy consumption for instance.

According to various industry standards, a BS may initiate and engage in operation in lean-carrier mode at certain times. In particular, the BS may initiate operation in the lean-carrier mode responsive to detecting that bearer data has not been communicated on the carrier for at least a threshold time period. Further, when the BS then operates in lean-carrier mode, the BS may do so as long as bearer data is not being communicated on the carrier. But when UE(s) then do have bearer data to transmit and/or receive on the carrier, the BS may stop operating in lean-carrier mode and may again operate in legacy mode.

Unfortunately, due to such standards for initiation and engagement in lean-carrier mode, a BS may not often operate in lean-carrier mode. In particular, a situation in which there is no bearer data being communicated on the carrier is unlikely to arise often, as there is likely to be at least one UE engaged in bearer data communication on the carrier at any given time. As a result, the BS may not be able to use lean-carrier mode often, which may lead to a higher extent of network interference and/or energy consumption, among other outcomes.

To help resolve this issue, disclosed herein is an approach to segregate UEs among carriers, so as to increase the probability of a BS operating in lean-carrier mode. In accordance with the disclosed approach, the BS may identify served UE(s) that communicate bearer data less often than a threshold, such as less often than a predefined threshold or less often compared with other served UEs, among other options. And the BS may serve just those identified UEs on a particular carrier. In this way, the BS may increase a probability of there being periods of time when there is no bearer data communication on the particular carrier. As a result, the BS may also increase a probability of the BS initiating operation in lean-carrier mode and/or of the BS engaging in operation in lean-carrier mode, which may ultimately decrease the extent of interference and/or energy consumption in the network.

Accordingly, in one respect, disclosed is a method. The method may be operable in a BS that provides service at least on a particular carrier. The BS may be configured to operate in a lean-carrier mode in which the BS engages in a reduced extent of reference signaling on the particular carrier. Also, the BS may operate in the lean-carrier mode when bearer data is not being communicated on the particular carrier. In accordance with the method, of a plurality of UEs served by the BS, the BS may identify one or more UEs based on each UE communicating bearer data less frequently than a threshold frequency of bearer data communication. And the BS may serve just the identified UEs on the particular carrier, thereby increasing a probability of the BS operating in the lean-carrier mode.

In another respect, disclosed is another method. Here again, the method may be operable in a BS that provides service at least on a particular carrier. The BS may be configured to operate in a lean-carrier mode in which the BS engages in a reduced extent of reference signaling on the particular carrier. Also, the BS may operate in the lean-carrier mode when bearer data is not being communicated on the particular carrier. In accordance with the method, of a plurality of UEs served by the BS, the BS my identify a proper subset of the UEs based on the identified UEs communicating bearer data less frequently than remaining UEs of the plurality. And the BS may serve just the identified UEs on the particular carrier, thereby increasing a probability of the BS operating in the lean-carrier mode.

In yet another respect, disclosed is wireless communication system. The system may include a BS that may provide service at least on a particular carrier and that may be configured to operate in a lean-carrier mode in which the BS engages in a reduced extent of reference signaling on the particular carrier. Also, the BS may operate in the lean-carrier mode when bearer data is not being communicated on the particular carrier. Furthermore, the system may include a controller configured to carry out the following operations: (i) of a plurality of UEs served by the BS, identifying one or more UEs based on each UE communicating bearer data less frequently than a threshold frequency of bearer data communication, and (ii) causing the BS to serve just the identified UEs on the particular carrier, thereby increasing a probability of the BS operating in the lean-carrier mode.

Still further, in yet another respect, disclosed is a non-transitory computer-readable medium having stored thereon instructions executable by a processor to segregate UEs among carriers, so as to help facilitate operation in lean-carrier mode.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

The present methods and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
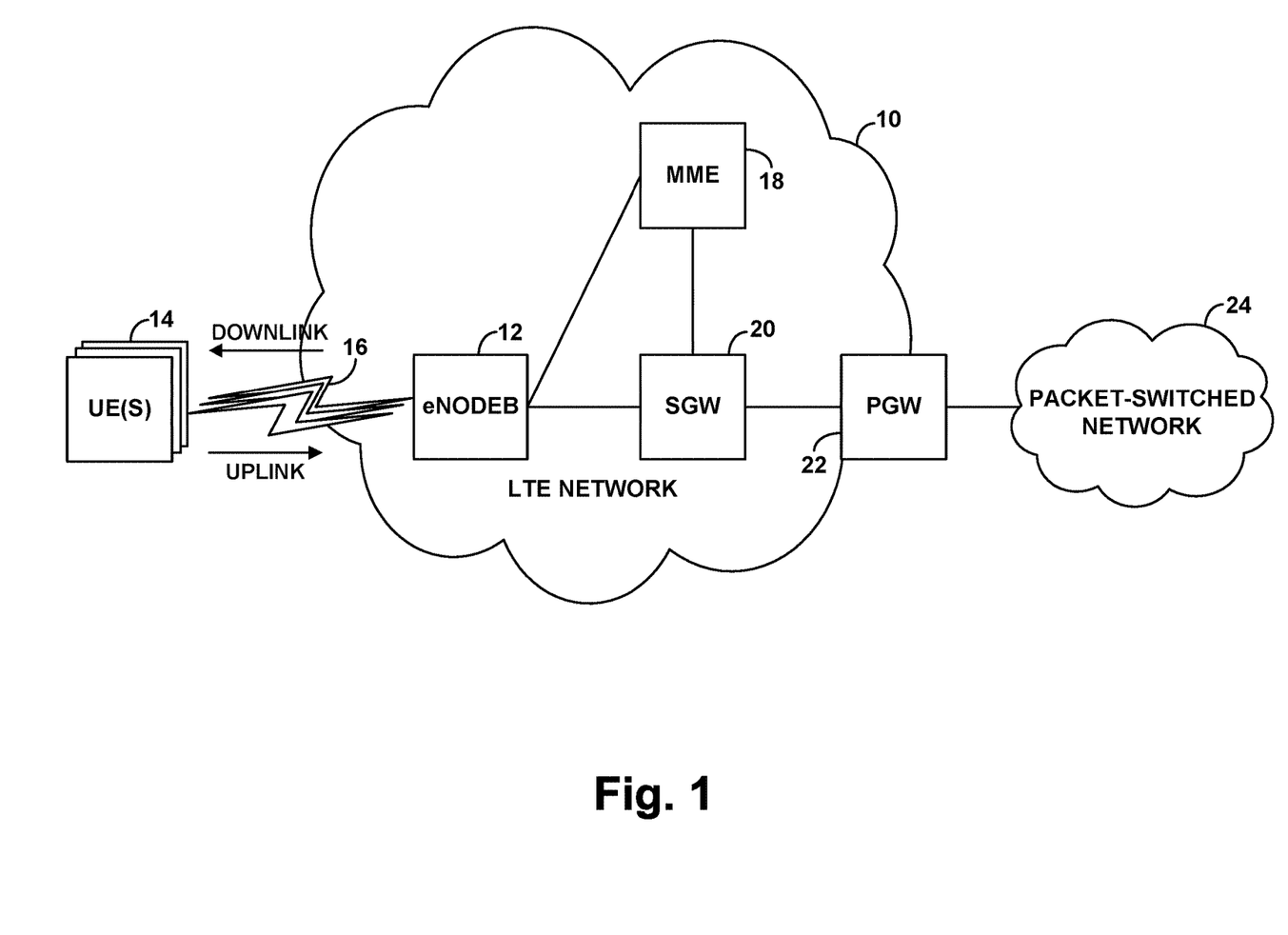
FIG. 1 is a simplified block diagram of a wireless communication system in which the present method can be implemented.

Referring to the drawings, FIG. 1 is a simplified block diagram of a wireless communication system in which the present method can be implemented. In particular, FIG. 1 depicts a representative LTE network 10, which functions primarily to serve UEs with wireless packet data communication service, including possibly voice over Internet Protocol (VoIP) service, but may also provide other functions. As shown, the LTE network 10 includes at least one example LTE macro BS 12 known as an eNodeB, which has an antenna structure and associated equipment for providing an LTE coverage area in which to serve one or more UEs 14. More specifically, the eNodeB 12 radiates to define one or more wireless air interfaces 16 through which the eNodeB 12 may respectively communicate with one or more served UEs 14 via the downlink and the uplink.

As shown in FIG. 1, the eNodeB 12 has a communication interface with a Mobility Management Entity (MME) 18. The MME 18 can function as a signaling controller for the LTE network 10. Further, the eNodeB 12 has a communication interface with a serving gateway (SGW) 20, which in turn has a communication interface with a packet-data network gateway (PGW) 22 that provides connectivity with a packet-switched network 24, and the MME 18 has a communication interface with the SGW 20. In particular, the eNodeB 12 may be communicatively linked with a core network, which may be operated by a wireless service provider. The core network then provides connectivity with one or more MMES, such as MME 18, as well as one or more gateways such as SGW 20 and PGW 22.

In line with the discussion above, an eNodeB and a UE may be configured (e.g., licensed and programmed) to support air interface communication on various particular carriers. Each such carrier may be identified by one or more globally unique identifiers per industry standard, so that the eNodeB and a served UE can refer to particular carriers by those identifiers. Moreover, as noted, an air interface may support communications on defined resources.

Figure 2A:
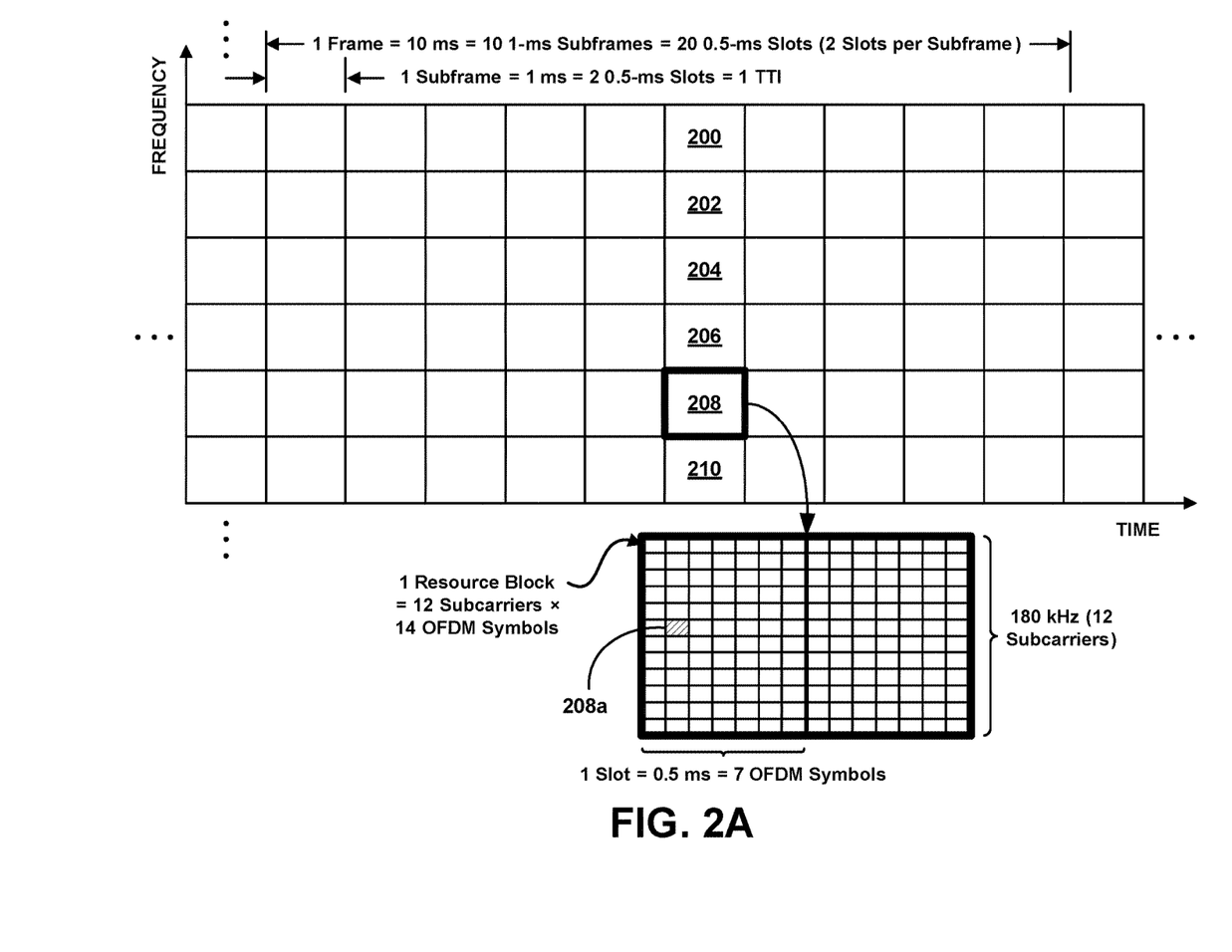
FIG. 2A is a conceptual illustration of a division of air interface resources into resource blocks, in accordance with an example embodiment.

FIG. 2A illustrates how the resources may be divided in time and frequency domains into resource blocks under LTE, such as into resource blocks 200-210 for instance. As shown, in the time domain, each resource block occupies a 1 millisecond (ms) subframe. But in other implementations, a given resource block could instead occupy a 0.5 ms segment. Further, in the frequency domain, each resource block occupies a respective portion of frequency bandwidth, typically 180 kHz. For purposes of illustration, FIG. 2A shows resource blocks across twelve subframes in time and six 12-subcarrier groupings in frequency. However, each LTE frame typically has 10 subframes, while the number of resource blocks spanning frequency depends on the bandwidth of the carrier. For instance, in a 5 MHz LTE carrier, a total of 25 resource blocks may span frequency during each 1 ms subframe.

FIG. 2A also includes a detailed view of resource block 208, illustrating resource elements, such as resource element 208a, arrayed in time and frequency. This detailed view shows that the 180 kHz of frequency bandwidth corresponds to 12 subcarriers (of 15 kHz each), and also shows that the 1 ms subframe corresponds to the duration of 14 OFDM symbols (although a different number of symbols per resource block can be used). Generally, each resource element corresponds to a modulated subcarrier symbol that is carried on a particular subcarrier for the duration of one symbol time.

Figure 2B:
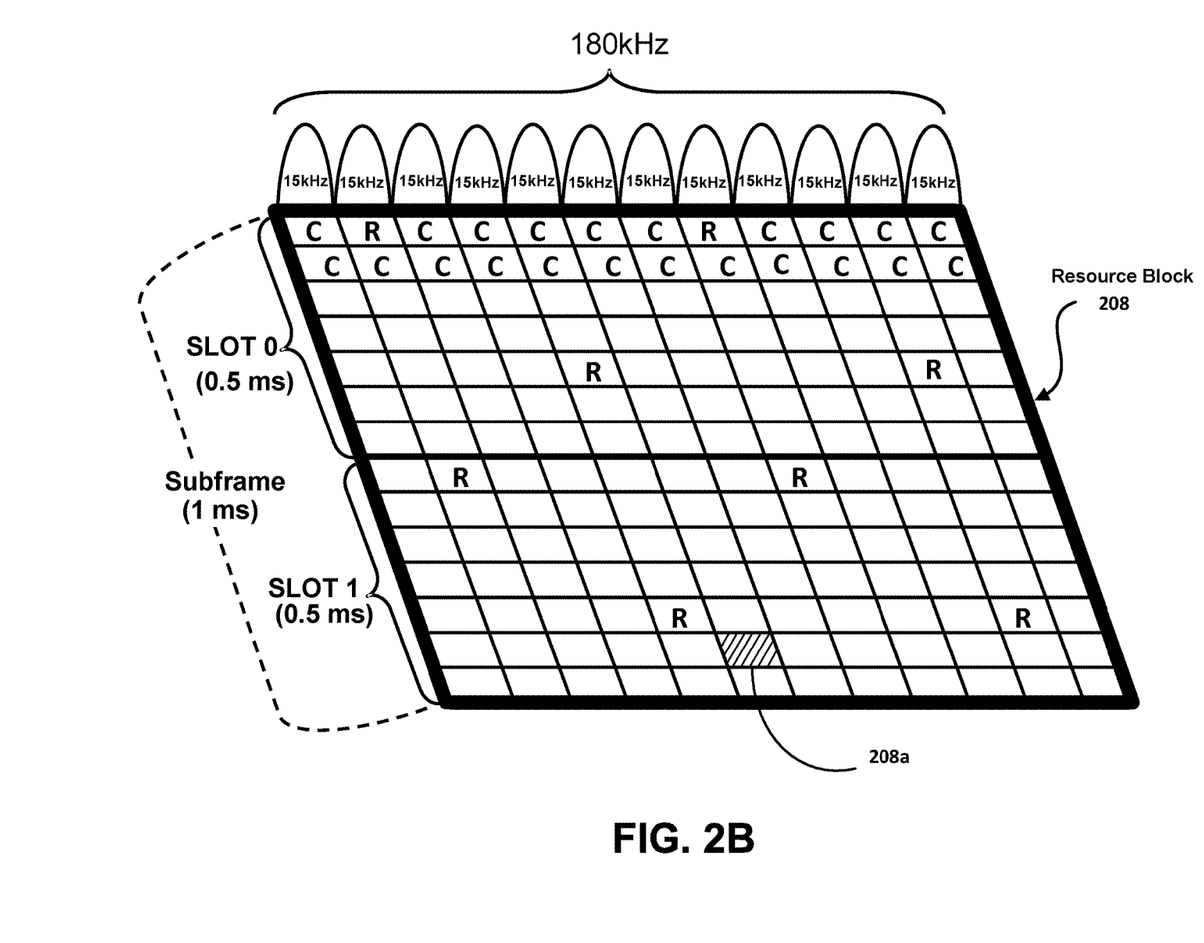
FIG. 2B is a conceptual illustration of a resource block, in accordance with an example embodiment.

The use of different resource elements for different purposes is illustrated by way of example for a downlink resource block in FIG. 2B. In this example, 8 of the resource elements are labeled with "R" to indicate that they are reserved for reference signals used for channel estimation and/or other purposes. In addition, 22 of the resource elements in the first two OFDM symbols are labeled "C" to indicate that they are used to transmit control signaling (including for instance the PDCCH). The other 138 resource elements that are unlabeled can be used to define the PDSCH for transmitting bearer data and other scheduled transmissions. Other resource block configurations are possible as well.

In a system arranged as described above, when the UE enters into coverage of the eNodeB, the UE may detect the eNodeB's coverage on a particular carrier, and the UE and eNodeB may engage in an attach process or handover process to register with the LTE network on that carrier, configuring service of the UE by the eNodeB on that carrier. For instance, the UE may initially transmit an access request message on the carrier to the eNodeB, and the UE and eNodeB may then engage in signaling in accordance with a Radio Resource Control (RRC) protocol to establish a radio-link-layer connection (RRC connection) on which the UE and eNodeB can engage in further communication. In turn, the UE may then transmit to the eNodeB via the RRC connection an attach request seeking to register with the LTE network and be served by the eNodeB, and the eNodeB may pass the attach request along to the MME for processing.

After authenticating the UE, the MME may then engage in signaling with the eNodeB and SGW to establish for the UE one or more logical bearer connections, or bearers, between the UE and the PGW. Each such bearer may include a radio bearer portion over the air between the UE and the eNodeB, and a service bearer or access bearer portion between the eNodeB and the PGW via the SGW. Further, the eNodeB may store a context record for the UE, indicating service state and parameters for serving the UE, such as an identification of the carrier on which the eNodeB is serving the UE. And the UE may likewise store a context record indicating its service state and parameters for being served, such as the carrier on which it is being served.

With service of the UE so configured, the eNodeB could then serve the UE with data communications over the air interface. Specifically, the UE may operate in an RRC connected mode in which the UE has a radio-link-layer connection with the eNodeB and thus may engage in bearer data communications, such as voice calls and/or data sessions, on a carrier's air interface resources assigned by the eNodeB.

After a timeout period of no bearer data communication between the UE and the eNodeB, or for other reasons, the network may be arranged to automatically release the UE's established radio-link-layer connection and perhaps one or more bearers for the UE between the eNodeB and the gateway system, while maintaining at least some network records and/or connections for the UE. At that point, the UE may then be considered to be in an RRC idle mode in which the UE does not have a radio-link-layer connection with the eNodeB and thus does not engage in bearer data communications. In the RRC idle mode, if the system has bearer data to transmit to the UE or if the UE has data to transmit to the system, the UE may need to engage in an access and connection process similar to or the same as that described above, to acquire a radio-link-layer connection over which the data can flow, transitioning the UE back to RRC connected mode.

Furthermore, in the process of transitioning from RRC connected mode to RRC idle mode and/or while in RRC idle mode, the UE may operate in a discontinuous reception (DRX) mode in order to conserve battery power and/or for other reasons. More specifically, when the UE is operating in an RRC connected mode, once the UE's bearer data communication finishes, the UE may initiate a DRX inactivity timer. If there is no further bearer data communication before expiration of the DRX inactivity timer, the UE may then enter DRX mode responsive to expiration of the DRX inactivity timer. Moreover, when the UE enters RRC idle mode after the timeout period (typically longer than the DRX inactivity timer), the UE may additionally or alternatively operate in the DRX mode during RRC idle mode.

When the UE operates in the DRX mode, the UE may operate with a DRX cycle. More specifically, the UE can operate in a low power mode in which the UE does not engage in any communication with the eNodeB. As the UE operates in the low power mode, the UE can "wake up" from time-to-time (e.g., every 320 ms) for a particular duration (e.g., 10 ms) to check the PDCCH for page messages and other information regarding incoming communications and/or to transmit uplink control signaling to initiate communications, among other options. Thus, if the network has a call or other bearer communication to provide to the UE, the eNodeB could broadcast a page message destined to the UE, and the UE could detect that page message when it is "awake" and could responsively engage in signaling with the eNodeB (e.g. to re-establish a radio-link-layer connection) so as to then receive the communication. And if the UE has a call or other bearer communication to initiate, the UE could similarly engage in signaling with the eNodeB when "awake" (e.g., to re-establish a radio-link-layer connection) so that the UE could then provide that communication. Otherwise, if the UE does not detect a page message while "awake" and does not have uplink control signaling to transmit while "awake", the UE can return to the low power mode before "waking up" again according to the DRX cycle, and so on.

Further, when the eNodeB serves the UE, the eNodeB could maintain a record of the UE's operation in the various modes described above. For example, as the UE transitions between RRC connected mode and RRC idle mode, the eNodeB may receive signaling indicative of that transition and may update the UE's context record to indicate whether the UE is operating in the RRC connected mode or in RRC idle mode. In another example, based on timing measured from the last bearer data communication with the UE and on information about the duration of the DRX inactivity timer, the eNodeB could determine when the UE operates in the DRX mode and perhaps when the UE operates in the low power mode of the DRX cycle. With these arrangements, the eNodeB could then effectively maintain a device history record for the UE that includes information about the UE's operation in the connected, idle, and/or DRX modes and thus may include information indicative of how frequently the UE communicates bearer data, among other information. Other examples are also possible.

In a further aspect, when a UE is being served by an eNodeB on a serving carrier, the eNodeB could hand over the UE to be served on another carrier. More specifically, the UE may monitor signal strength (e.g., signal-to-noise ratio) of reference signals received from the serving eNodeB, and the UE may apply various thresholds to control carrier frequency scanning and possible resulting handover to another carrier (e.g., provided by the same serving eNodeB). For example, LTE may define a start-scanning threshold for serving-carrier signal strength, such that when the UE detects that the signal strength on the serving carrier is lower than the start-scanning threshold, the UE starts to scan for coverage on one or more other carriers. Further, LTE may define a handover threshold for serving-carrier signal strength (e.g., equal to or lower than the start-scanning threshold), such that when the UE finds coverage on at least one target carrier and detects that the signal strength on the serving carrier is lower than the handover threshold, the UE begins engaging in signaling with its serving eNodeB to possibly trigger handover of the UE to that target carrier.

In practice, the signaling that the UE engages in to possibly trigger handover may take one of various forms. For example, the UE may transmit to its serving eNodeB a measurement report that specifies the coverage detected on one or more carriers and, for each such detected coverage, the detected signal strength, thereby indicating one or more candidate carriers. The serving eNodeB and/or associated network infrastructure may then decide based on the UE's measurement report to process a handover of the UE to a particular carrier from which the UE detected sufficiently strong signal strength. In doing so, the serving eNodeB and/or associated network infrastructure may engage in a carrier-selection process to select the particular carrier from among the one or more candidate carriers, such as based on detected signal strength, among other factors. Then, assuming that the selected carrier is provided by the same serving eNodeB, the serving eNodeB may facilitate service of the UE on the selected carrier by engaging with the UE in RRC connection reconfiguration messaging in which the eNodeB identifies the selected carrier on which the eNodeB is to serve the UE. Other examples are possible as well.

In line with the discussion above, an eNodeB may be configured to broadcast a reference signal to enable UEs to detect and evaluate coverage quality and/or for other purposes. To facilitate this reference signal broadcast, the eNodeB could include a radio, a power amplifier, and an antenna structure. The radio could generate the reference signal, by modulating radio-frequency subcarriers or the like to represent the reference signal, encoding an identifier of the eNodeB or its coverage area. The power amplifier could then build up power level (energy level) of modulated reference signal to a desired level. And the antenna structure could then transmit the modulated reference signal at that power level for receipt and evaluation by UEs. Moreover, each UE is then correspondingly configured to receive and evaluate such eNodeB reference signals. For instance, a UE could include an antenna structure to receive air interface transmission, and a radio to demodulate, read, and evaluate the reference signal.

With this arrangement, the reference signal broadcast can take various forms depending on the air interface protocol in use. For example, as noted, LTE specifies, among other reference signals, a CRS that UEs can detect for searching and acquiring eNodeB, measuring downlink quality, and estimating downlink channels for coherent demodulation and detection of downlink signals. The CRS is allocated specific resource elements in each resource block and, in legacy mode, the CRS is transmitted on each allocated resource element in every downlink resource block during every subframe. In this regard, the specific resource elements allocated to the CRS in each resource block form a pattern within the array of resource elements of each resource block, such as the reference-signal pattern illustrated by FIG. 2B. Although FIG. 2B illustrates one such reference-signal pattern, other reference-signal patterns are also possible according to legacy mode.

More specifically, a UE may be configured to scan for a primary synchronization signal on the carrier in order to determine the carrier frame timing. For example, the UE may read the 62 centrally located resource elements over time on the carrier until the UE finds that those resource elements carry a primary synchronization signal of a predefined form or value. Given knowledge of the relative time position of that primary synchronization signal within a frame, the UE may thereby learn the frame timing, so that the UE can then read other downlink communications on the carrier.

Further, based on the primary synchronization signal value, the UE may determine the reference-signal pattern on the carrier, defining which resource elements per subframe carry the CRS, so that the UE can then evaluate coverage strength on the carrier. For example, a modulo-3 function of the primary synchronization signal value establishes which of three possible reference-signal patterns the eNodeB uses. So the UE may read the primary synchronization signal value and compute that modulo-3 function so as to determine which resource elements per subframe carry the CRS on the carrier. And the UE may then evaluate transmission strength on those resource elements, to evaluate coverage strength. Other examples are also possible.

Figure 3:
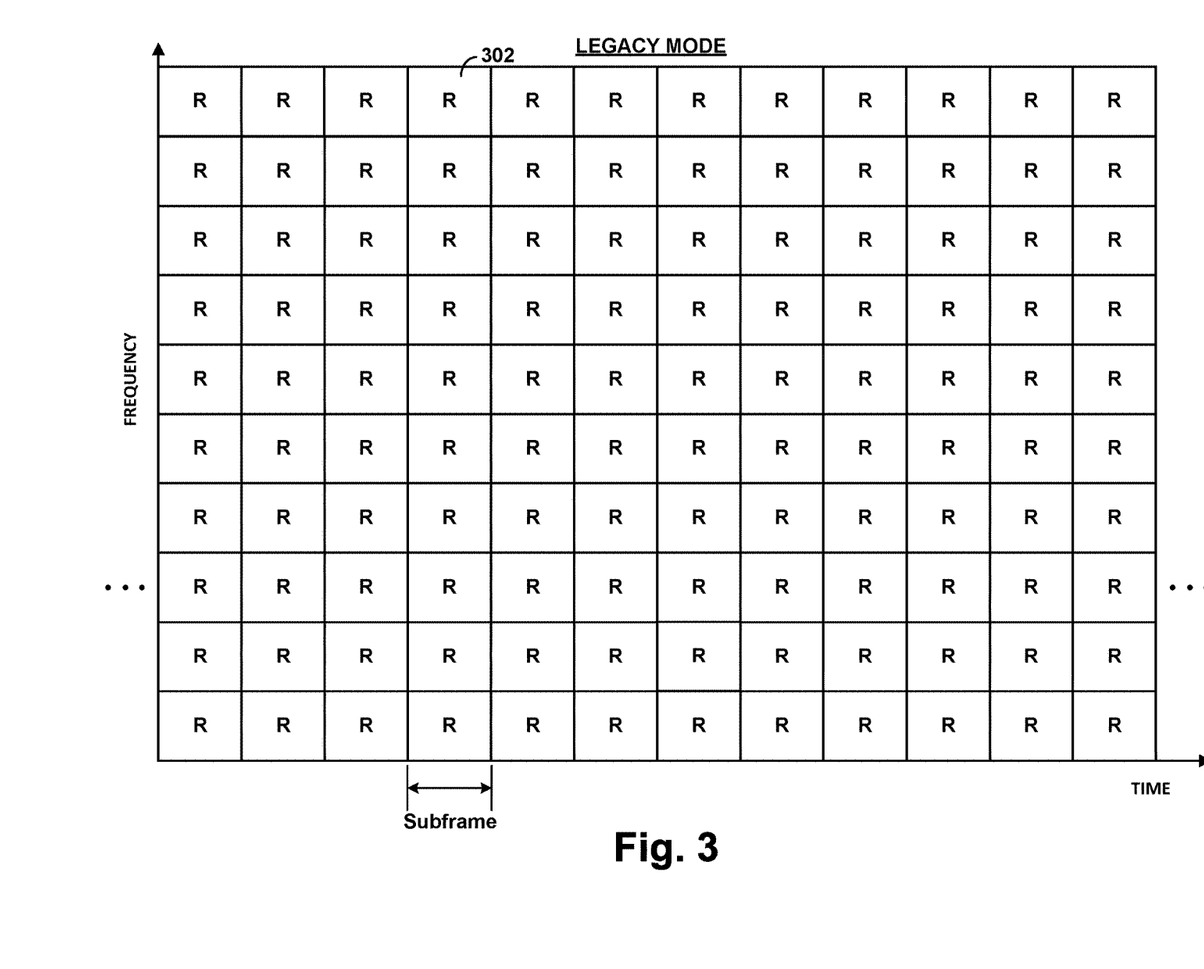
FIG. 3 is a conceptual illustration of reference signaling during operation in legacy mode, in accordance with an example embodiment.

FIG. 3 next illustrates reference signaling in accordance with operation in legacy mode. In particular, FIG. 3 shows a plurality of resource blocks, such as resource block 302, each occupying a subframe. Each respective resource block is labeled with "R" to indicate that a CRS is transmitted within that respective resource block using a reference-signaling pattern within the resource block. As such, in legacy mode, CRS is transmitted by default within all resource blocks across a carrier during each subframe. Other illustrations are possible as well.

As noted, while CRS transmission is needed for proper operation of the air interface of an LTE system, resource elements carrying the CRS transmitted by one eNodeB can cause interference with resource elements carrying data transmitted by a neighboring eNodeB. For at least this reason, the wireless communication industry has introduced a lean-carrier mode in which an eNodeB engages in reduced reference signaling on a carrier compared to the extent to which the eNodeB engages in reference signaling on the carrier when it operates in legacy mode.

Generally, the eNodeB may indicate to UE(s) in various ways that the eNodeB is operating in lean-carrier mode. For example, the eNodeB could specify operation in lean-carrier mode through a function of a primary synchronization signal that establishes which resources are used for reference signaling in accordance with the lean-carrier mode. Thus, a UE may compute that function so that the UE could determine which resource blocks, subframes, and/or resource elements per subframe carry the reference signal on the carrier. Other examples are also possible.

Moreover, the lean-carrier mode's reduction in reference signaling may take various forms. In particular, during lean-carrier mode, the eNodeB may engage in reference signaling (e.g., CRS) on a carrier less frequently over time compared to how frequently the eNodeB engages in reference signaling on the carrier when operating in legacy mode. Additionally or alternatively, the eNodeB may engage in reference signaling (e.g., CRS) on a lesser extent of the carrier's bandwidth compared to the extent of the carrier's bandwidth on which the eNodeB engages in reference signaling when operating in legacy mode.

Figure 4:
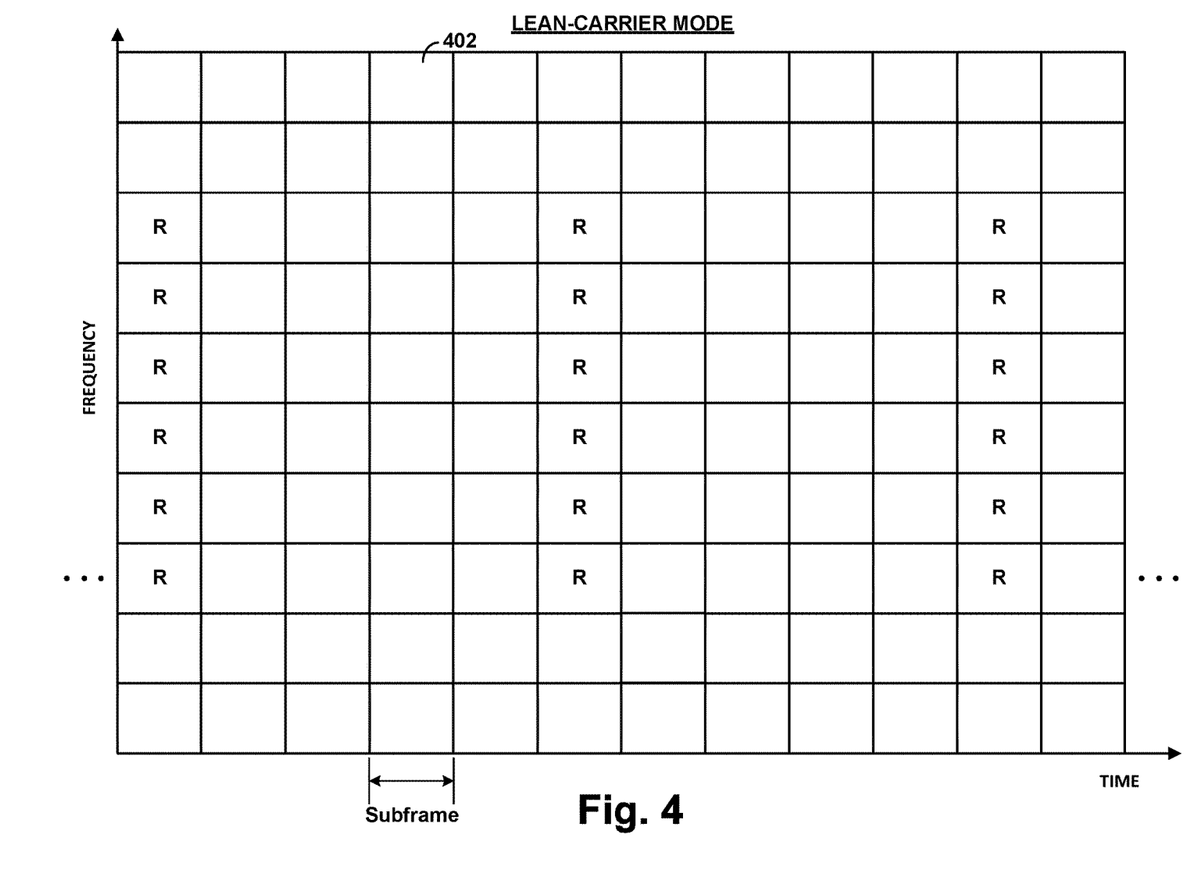
FIG. 4 is a conceptual illustration of reference signaling during operation in lean-carrier mode, in accordance with an example embodiment.

Without limitation, FIG. 4 next illustrates an example of reduced reference signaling in accordance with operation in lean-carrier mode. Here again, FIG. 4 shows a plurality of resource blocks, such as resource block 402, each occupying a subframe. Each resource block that is labeled with "R" indicates a resource block on which a CRS is transmitted, with transmission of a CRS on any given resource block being according to a reference-signaling pattern. As such, in lean-carrier mode, CRS could be transmitted on select subframes (e.g., every fifth subframe) and on select resource blocks (e.g., on the carrier's six center resource blocks) of each such select subframe. Other lean-carrier mode configurations are possible as well.

Yet further, as noted, an eNodeB may initiate and engage in operation in lean-carrier mode at certain times. In particular, the eNodeB may transition from operation in legacy mode to operation in the lean-carrier mode responsive to detecting that bearer data has not been communicated on the carrier for at least a threshold time period (e.g., established via manual engineering input). Further, when the eNodeB then operates in lean-carrier mode, the eNodeB may do as long as bearer data is not being communicated on the carrier. Thus, when UE(s) then do have bearer data to transmit and/or receive on the carrier, the eNodeB may responsively stop operating in lean-carrier mode and may transition back to operating in legacy mode.

As noted above, although lean-carrier mode may help reduce network interference, an eNodeB may not often operate in lean-carrier mode, as there is likely to be at least one UE engaged in bearer data communication on the carrier at any given time. To help resolve this issue, the disclosed approach provides for an eNodeB to segregate UEs among carriers, so as to increase the probability of the eNodeB operating in lean-carrier mode.

In accordance with the disclosed approach, the eNodeB can segregate UEs by putting on a first carrier all of the UEs determined to have a relatively low frequency (or zero extent) of bearer data communication and by putting on one or more second carriers UEs determined to not have such a low frequency (or zero extent) of bearer data communication. That way, it could become more possible to apply the lean-carrier mode at least on the first carrier, rather than likely being precluded from applying the lean-carrier mode on all of the carriers.

To help facilitate the disclosed approach, the eNodeB could have stored thereon or otherwise have access to an indication of particular carrier(s) for which the eNodeB should seek to increase the probability of operating in lean-carrier mode. Thus, the eNodeB may refer to such an indication when carrying out the disclosed approach, so as to ultimately make it more possible to apply lean-carrier mode on the particular carrier(s). Moreover, the eNodeB could carry out the disclosed approach in various situations.

In one case, during establishment of an RRC connection for a UE, the eNodeB may determine whether or not the UE communicates bearer data less frequently than a threshold. If the eNodeB determines that the UE does communicate bearer data less frequently than a threshold and assuming that the UE is not already being served on a particular carrier for which the eNodeB seeks to increase the probability of operating in lean-carrier mode, then the eNodeB may responsively configure the UE's RRC connection to encompass the particular carrier, specifically doing so by transmitting to the UE an RRC configuration message that specifies the particular carrier as the carrier on which the eNodeB will serve the UE. Otherwise, if the eNodeB determines that the UE communicate bearer data more frequently than the threshold, then the eNodeB may responsively configure the UE's RRC connection to encompass another carrier other than the particular carrier.

In another case, the eNodeB may evaluate a UE during a carrier-selection process that helps facilitate handover of the UE in accordance with the discussion above. In particular, assuming that one of the candidate carriers being considered during the carrier-selection process is a particular carrier for which the eNodeB seeks to increase the probability of operating in lean-carrier mode, the eNodeB may determine, during the carrier-selection process, whether or not the UE communicates bearer data less frequently than a threshold. If the eNodeB determines that the UE does communicate bearer data less frequently than a threshold, then the eNodeB may responsively select the particular carrier as the carrier to which to handover the UE and may then facilitate handover of the UE to the particular carrier. Otherwise, if the eNodeB determines that the UE communicate bearer data more frequently than the threshold, then the eNodeB may responsively select another carrier other than the particular carrier, and may then facilitate handover of the UE to that other carrier.

In yet another case, the eNodeB may carry out the disclosed approach from time-to-time, such as in accordance with a predetermined schedule for instance. In particular, the eNodeB may from time-to-time evaluate a plurality of served UEs and may identify UE(s) of the plurality that respectively communicate bearer data less frequently than a threshold. The eNodeB may then serve just those identified UE on a particular carrier for which the eNodeB seeks to increase the probability of operating in lean-carrier mode. In practice, the eNodeB may do so by respectively handing over each identified UE from its current serving carrier to the particular carrier and/or may do so in other ways. Other cases are also possible.

Further, in an example arrangement, the eNodeB may use information found in a device history record maintained for a given UE as basis for determining how frequently the given UE communicates bearer data. In particular, as noted, the eNodeB may maintain for a UE a device history record that includes information about the UE's operation in the connected, idle, and/or DRX modes. Specifically, the device history record may include information specifying a time that the UE operated in a particular one of the modes and/or a duration for which the UE operated in a particular one of the modes, among other options. Thus, the eNodeB could use the information in the device history record as basis for determining times when the UE does or does not communicate bearer data and/or durations for which the UE does or does not communicate bearer data, among other options. For instance, the eNodeB may determine that times when the UE had operated in RRC idle mode and/or in low power mode of the DRX cycle are times when the UE did not communicate bearer data.

Thus, with this arrangement, the eNodeB could determine how frequently a UE communicates bearer data based on how frequently the UE transitions from operating in RRC connected mode to operating RRC idle mode, based on how frequently the UE operates in RRC idle mode, based on how frequently the UE transitions to operating in DRX mode, based on how frequently the UE operates in DRX mode, and/or based on how frequently the UE operates in low power mode of the DRX cycle, among other options.

Moreover, when determining how frequently a given UE communicates bearer data, the eNodeB may define the frequency of bearer data communication in various ways. In one example, the eNodeB may determine how frequently on average the UE has transitioned from RRC connected mode to RRC idle mode per hour or per day, among other time periods. In another example, the eNodeB may determine how long on average the UE has operated in RRC idle mode per hour or per day, among other time periods. In yet another example, the eNodeB may determine how frequently on average the UE has transitioned to operating in DRX mode per hour or per day, among other time periods. In yet another example, the eNodeB may determine how long on average the UE has operated in the low power mode per hour or per day, among other time periods. Other examples are possible as well.

Given this arrangement, the eNodeB could identify in various ways one or more UEs that the eNodeB should serve on a particular carrier for which the eNodeB seeks to increase the probability of operating in lean-carrier mode.

In a first example implementation, the eNodeB may determine whether or not to serve a UE on the particular carrier based on whether or not the UE communicates bearer data less frequently than a predefined threshold frequency of bearer data communication. In particular, if the eNodeB determines that the UE indeed communicates bearer data less frequently than the predefined threshold frequency of bearer data communication, the eNodeB may responsively configure service for the UE on the particular carrier. Otherwise, if the eNodeB determines that the UE communicates bearer data more frequently than the predefined threshold frequency of bearer data communication, the eNodeB may responsively configure or maintain service for the UE on another carrier other than the particular carrier.

In this implementation, the predefined threshold frequency of bearer data communication may take various forms and thus the eNodeB may determine in various ways that a UE communicates bearer data less frequently than a predefined threshold frequency. In one case, the eNodeB may determine that a UE communicates bearer data less frequently than a predefined threshold frequency by determining that the UE has transitioned on a threshold frequent basis (e.g., more than twenty times per hour) from operating in RRC connected mode to operating in RRC idle mode. In another case, the eNodeB may determine that a UE communicates bearer data less frequently than a predefined threshold frequency by determining that the UE has operated in RRC idle mode on a threshold frequent basis (e.g., for an average of more than thirty minutes per hour). In yet another case, the eNodeB may determine that a UE communicates bearer data less frequently than a predefined threshold frequency by determining that the UE has transitioned on a threshold frequent basis (e.g., more than fifty times per day) to operating in DRX mode. In yet another case, the eNodeB may determine that a UE communicates bearer data less frequently than a predefined threshold frequency by determining that the UE has operated on a threshold frequent basis (e.g., for an average of more than five hours per day) in DRX mode. In yet another case, the eNodeB may determine that a UE communicates bearer data less frequently than a predefined threshold frequency by determining that the UE has operated in low power mode on a threshold frequent basis (e.g., for an average of more than twenty minutes per hour). Other cases are possible as well.

In a second example implementation, the eNodeB may evaluate a plurality of UEs and, of the plurality of UEs, the eNodeB may identify a proper subset of the UEs based on the identified UEs communicating bearer data less frequently than remaining UEs of the plurality. The eNodeB may then serve just the identified UEs on the particular carrier. And as for the remaining UEs, the eNodeB may serve those on carrier(s) other than the particular carrier.

In this implementation, the eNodeB may identify the proper subset of UEs in various ways. In one case, the eNodeB may determine an average frequency of bearer data communication by a UE of the plurality of UEs being evaluated, and the eNodeB may identify a proper subset of the UEs based on the identified UEs communicating bearer data less frequently than the determined average. For example, the eNodeB may determine how frequently on average a UE of the plurality has transitioned from RRC connected mode to RRC idle mode, and the eNodeB may identify a proper subset of the UEs based on the identified UEs having transitioned from RRC connected mode to RRC idle mode more frequently than the determined average. In another case, the eNodeB may identify the proper subset of the UEs by identifying, from among the plurality of UEs being evaluated, a certain quantity of UEs (e.g., four UEs) that communicate bearer data least frequently. For example, the eNodeB may identify, from among the plurality of UEs being evaluated, the four UEs that most frequently operate in DRX mode. Other cases are possible as well.

In either implementation, the eNodeB may increase the probability of operating in lean-carrier mode on the particular carrier by facilitating the serving of just the identified UEs on the particular carrier. In particular, due to serving of just the identified UEs on the particular carrier, there would be a greater statistical likelihood that those served UEs' respective periods of operation in RRC idle mode and/or in low power mode would occur in at least some alignment. Consequently, by facilitating the serving of just the identified UEs on the particular carrier, the eNodeB may increase the probability of there being periods of time when there is no communication of bearer data on the particular carrier and thus may increase the probability of operating in lean-carrier mode on the particular carrier. Other implementations are also possible.

In a further aspect, the eNodeB could also evaluate UE(s) already being served on the particular carrier, so as to determine whether or not the eNodeB should continue to serve those UE(s) on the particular carrier.

In one case, the eNodeB may determine that a particular UE is already being served on the particular carrier and may determine whether the particular UE communicates bearer data more or less frequently than a predefined threshold frequency of bearer data communication, which may be a predefined threshold that is the same as or different from the above-described predefined threshold. In this case, if the eNodeB determines that the particular UE communicates bearer data less frequently than the predefined threshold, then the eNodeB may responsively continue serving the particular UE on the particular carrier. Whereas, if the eNodeB determines that the particular UE communicates bearer data more frequently than the predefined threshold, the eNodeB may responsively hand over the particular UE from the particular carrier to another carrier other than that particular carrier, thereby increasing the probability of the eNodeB operating in lean-carrier mode on the particular carrier.

In another case, when identifying a proper subset of the UEs based on the identified UEs communicating bearer data less frequently than remaining UEs of the plurality, the eNodeB may include UE(s) already being served on the particular carrier in the plurality of UEs being evaluated. In this case, if the eNodeB identifies a particular UE to be included the proper subset and determines that the particular UE is already being served on the particular carrier, then the eNodeB may responsively continue serving the particular UE on the particular carrier. Otherwise, if the eNodeB determines that a particular UE is already being served on the particular carrier but also determines that the particular UE should not be included in the proper subset, then the eNodeB may responsively hand over the particular UE from the particular carrier to another carrier other than that particular carrier, thereby increasing the probability of the eNodeB operating in lean-carrier mode on the particular carrier. Other cases are also possible.

Figure 5:
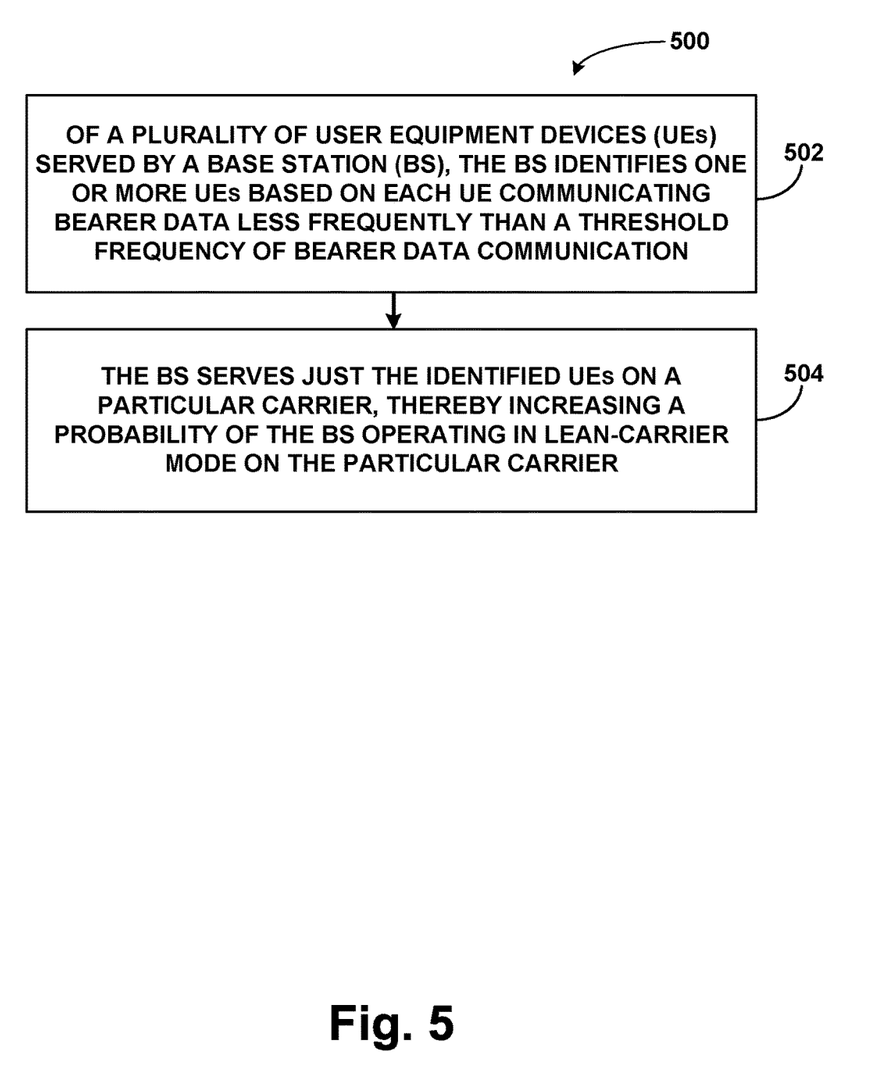
FIG. 5 is a flowchart illustrating a method to facilitate segregation of UEs among carriers, in accordance with an example embodiment.

FIG. 5 is next a flowchart illustrating a method 500 according to an example embodiment. Illustrative methods, such as method 500, may be carried out in whole or in part by component(s) and/or arrangement(s) in a wireless communication system, such as with one or more of the components of the example communication system shown in FIG. 1 and/or with one or more of the components of the example BS shown in FIG. 7 and further discussed below, among other possibilities. However, it should be understood that example methods, such as method 500, may be carried out by other entities or combinations of entities as well as in other arrangements, without departing from the scope of the disclosure.

In particular, method 500 is operable in a BS that provides service at least on a particular carrier. The BS is configured to operate in a lean-carrier mode in which the BS engages in a reduced extent of reference signaling on the particular carrier. Also, the BS operates in the lean-carrier mode when bearer data is not being communicated on the particular carrier.

As shown by block 502 in FIG. 5, method 500 involves, of a plurality of UEs served by the BS, the BS identifying one or more UEs based on each UE communicating bearer data less frequently than a threshold frequency of bearer data communication. And at block 504, method 500 then involves the BS serving just the identified UEs on the particular carrier, thereby increasing a probability of the BS operating in the lean-carrier mode.

Figure 6:
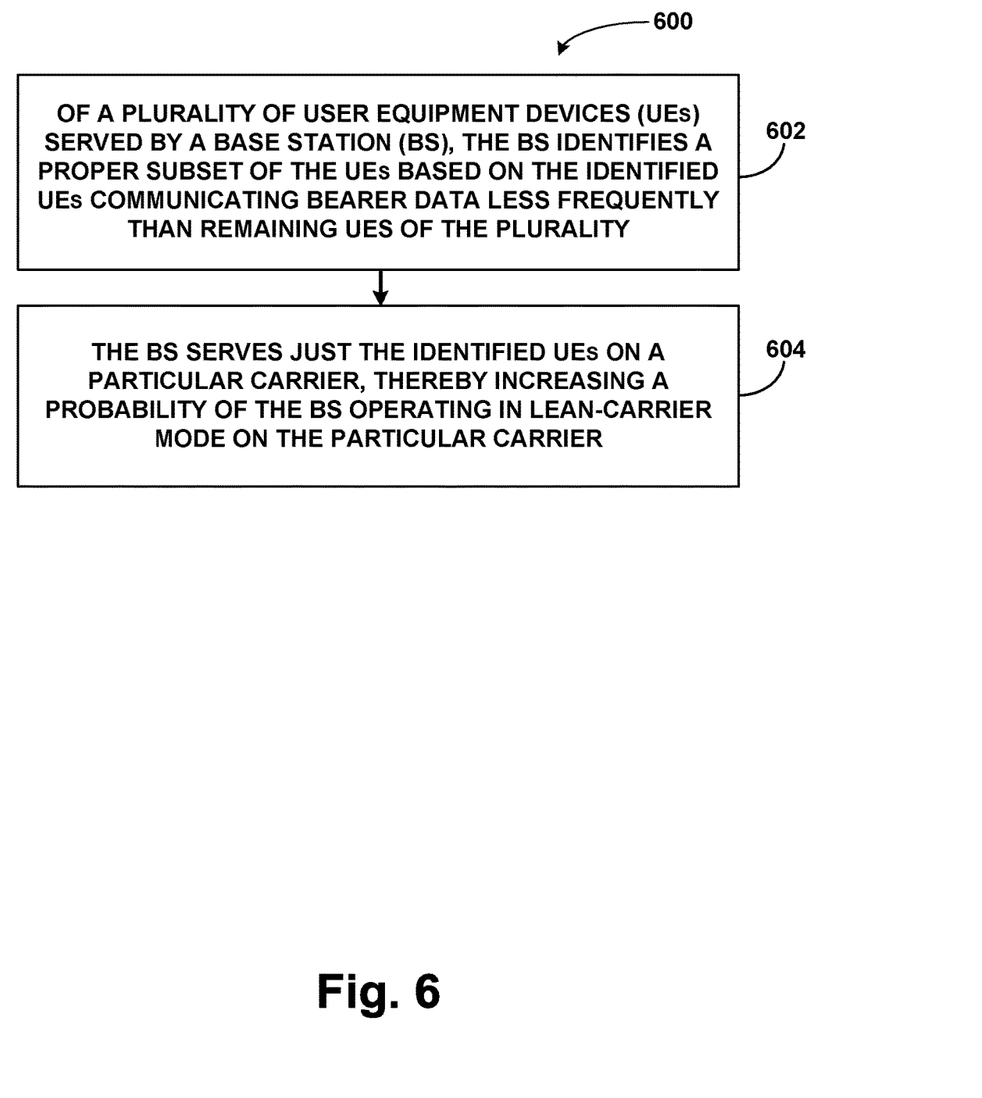
FIG. 6 is a flowchart illustrating another method to facilitate segregation of UEs among carriers, in accordance with an example embodiment.

FIG. 6 is next a flowchart illustrating a method 600 according to an example embodiment. In particular, method 600 is operable in a BS that provides service on a particular carrier. Here again, the BS is configured to operate in a lean-carrier mode in which the BS engages in a reduced extent of reference signaling on the particular carrier. Also, the BS operates in lean-carrier mode when bearer data is not being communicated on the particular carrier.

As shown by block 602 in FIG. 6, method 600 involves, of a plurality of UEs served by the BS, the BS identifying a proper subset of the UEs based on the identified UEs communicating bearer data less frequently than remaining UEs of the plurality. And at block 604, method 600 then involves the BS serving just the identified UEs on the particular carrier, thereby increasing a probability of the BS operating in the lean-carrier mode.

Figure 7:
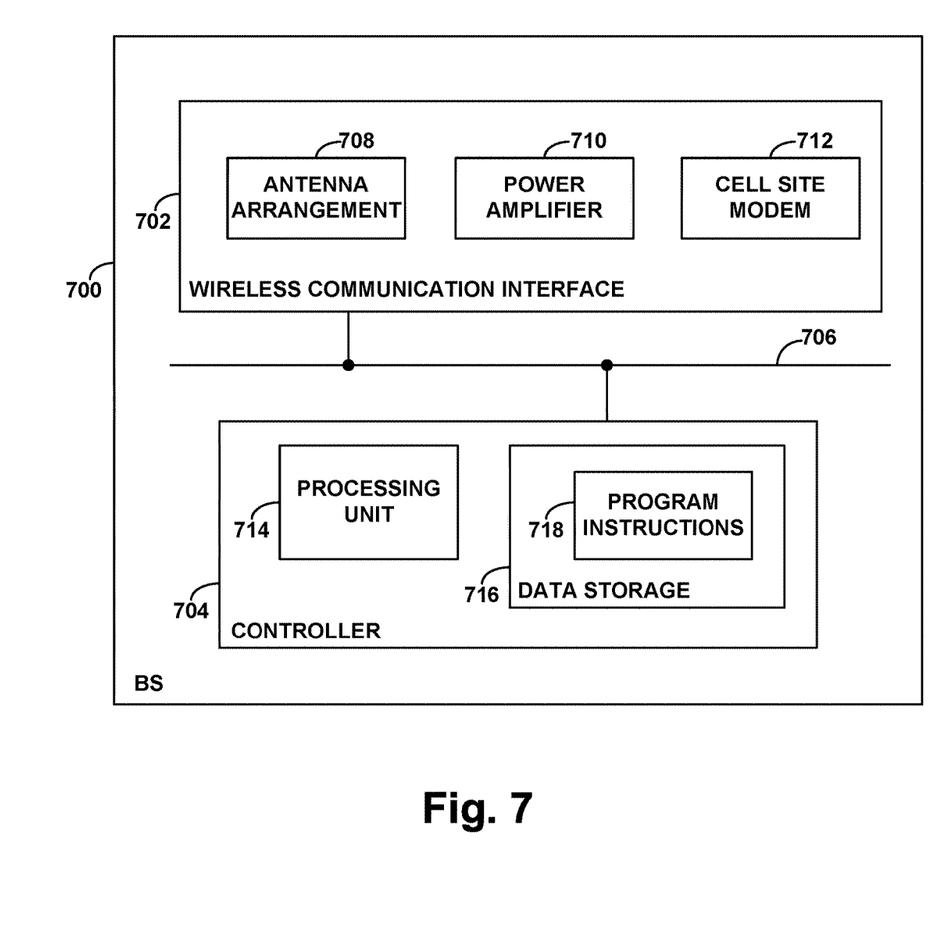
FIG. 7 is a simplified block diagram of a BS in which the present method can be implemented.

Finally, FIG. 7 is a simplified block diagram of a representative BS 700 such as eNodeB 12, illustrating some of the components that can be included in such an entity. As shown in FIG. 7, the representative BS 700 may include a wireless communication interface 702 and a controller 704. Additionally, these components of the BS 700 may be communicatively linked together by a system bus, network, or other connection mechanism 706. Alternatively, they may be integrated together in various ways.

As shown, interface 702 may include an antenna arrangement 708, which may be tower mounted, and associated components such as a power amplifier 710 and a cell site modem 712 for engaging in air interface communication with UEs via the antenna arrangement 708, so as to transmit data and control information to UEs and receive data and control information from UEs. Additionally, controller 704 may include processing unit 714 and data storage 716 and is arranged to manage or carry out various functions such as those discussed herein.

Processing unit 714 may then comprise general purpose processor(s) (e.g., microprocessors) and/or special-purpose processor(s) (e.g., digital signal processors and/or application specific integrated circuits) and may be integrated in whole or in part with the interface 702. And data storage 716 may include one or more volatile and/or non-volatile storage components, such as magnetic, optical, flash, or other types of non-transitory computer readable media, and may be integrated in whole or in part with processing unit 714.

As shown, data storage 716 may hold (e.g., have encoded thereon) program instructions 718, which may be executable by processing unit 714 to carry out various controller functions, such as by carrying out one or more of the operations described herein. As such, the processing unit 714 programmed with instructions 718 may define part or all of a controller for controlling operation of the BS 700. Alternatively or additionally, however, such control functionality could be provided external to the BS 700, in another entity (e.g., separate from the BS 700) such as by a BS control entity (e.g., MME), which may be communicatively linked with the BS 700 and may serve to control certain aspects of BS operation generally.

Exemplary embodiments have been described above. It should be understood, however, that variations from these embodiments are possible, while remaining within the true spirit and scope of the invention.

We claim:

1. A method operable in a base station (BS) that provides service at least on a particular carrier, wherein the BS is configured to operate in a legacy mode in which the BS engages in a particular extent of reference signaling on the particular carrier, wherein the BS is also configured to operate in a lean-carrier mode in which the BS engages in a reduced extent of reference signaling on the particular carrier, wherein the reduced extent is less than the particular extent, and wherein the BS operates in the lean-carrier mode when bearer data is not being communicated on the particular carrier, the method comprising:

of a plurality of user equipment devices (UEs) served by the BS, identifying, by the BS, one or more UEs based on each of the one or more UEs communicating bearer data less frequently than a threshold frequency of bearer data communication; and serving, by the BS, just the identified one or more UEs on the particular carrier, thereby increasing a probability of the BS operating in the lean-carrier mode.

2. The method of claim 1, wherein the BS engaging in the reduced extent of reference signaling on the particular carrier comprises the BS engaging in reference signaling less frequently over time compared to how frequently the BS engages in reference signaling on the particular carrier when operating in the legacy mode.

3. The method of claim 1, wherein the particular carrier spans a carrier bandwidth, wherein the BS engaging in the particular extent of reference signaling on the particular carrier comprises the BS engaging in reference signaling on a first extent of the carrier bandwidth, wherein the BS engaging in the reduced extent of reference signaling on the particular carrier comprises the BS engaging in reference signaling on a second extent of the carrier bandwidth, and wherein the second extent is lesser than the first extent.

4. The method of claim 1, wherein the BS initiates operation in the lean-carrier mode responsive to detecting that bearer data has not been communicated on the particular carrier for at least a threshold time period, the method further comprising:

during the serving of just the identified one or more UEs on the particular carrier, detecting, by the BS, that bearer data has not been communicated on the particular carrier for at least the threshold time period; and in response to the detecting, the BS initiating operation in the lean-carrier mode.

5. The method of claim 1, wherein identifying one or more UEs based on each of the one or more UEs communicating bearer data less frequently than a threshold frequency of bearer data communication comprises:

identifying one or more UEs based on each of the one or more UEs having transitioned on a threshold frequent basis from operating in a radio resource control (RRC) connected mode to operating in an RRC idle mode.

6. The method of claim 1, wherein identifying one or more UEs based on each of the one or more UEs communicating bearer data less frequently than a threshold frequency of bearer data communication comprises:

identifying one or more UEs based on each of the one or more UEs having operated on a threshold frequent basis in a discontinuous reception (DRX) mode.

7. The method of claim 1, wherein the BS is configured to refer to a data storage containing a respective device history record for each respective UE of the plurality of UEs, wherein each respective device history record includes information indicative of how frequently the respective UE communicates bearer data, and wherein the BS identifies the one or more UEs based on the information respectively included in one or more of the respective device history records.

8. The method of claim 1, wherein identifying one or more UEs based on each of the one or more UEs communicating bearer data less frequently than a threshold frequency of bearer data communication comprises, during establishment of a radio resource control (RRC) connection with a particular UE, making a determination that the particular UE communicates bearer data less frequently than the threshold frequency of bearer data communication, the method further comprising:

based at least on the determination, configuring, by the BS during establishment of the RRC connection, the RRC connection to encompass the particular carrier, thereby facilitating serving of the particular UE on the particular carrier.

9. The method of claim 1, wherein identifying one or more UEs based on each of the one or more UEs communicating bearer data less frequently than a threshold frequency of bearer data communication comprises, during a carrier-selection process in which the BS selects a carrier to which to hand over a particular UE, making a determination that the particular UE communicates bearer data less frequently than the threshold frequency of bearer data communication, the method further comprising:
    based at least on the determination, selecting, by the BS during the carrier-selection process, the particular carrier as the carrier to which to hand over the particular UE; and
    in response to selecting the particular carrier as the carrier to which to hand over the particular UE, invoking, by the BS, handover of the particular UE to the particular carrier, thereby facilitating serving of the particular UE on the particular carrier.

10. The method of claim 1, wherein the threshold frequency of bearer data communication is a first threshold frequency of bearer data communication, the method further comprising:
    determining, by the BS, that a particular UE is already being served by the BS on the particular carrier;
    making a determination, by the BS, that the particular UE communicates bearer data more frequently than a second threshold frequency of bearer data communication; and
    in response to making the determination, invoking, by the BS, handover of the particular UE from the particular carrier to another carrier other than the particular carrier, thereby increasing the probability of the BS operating in the lean-carrier mode.

11. The method of claim 10, wherein the second threshold frequency of bearer data communication is the same as the first threshold frequency of bearer data communication.

12. The method of claim 1, further comprising:
    transmitting, by the BS to each of the identified one or more UEs, a respective radio-link control message designating the particular carrier as the carrier on which the BS is to serve the identified UE, thereby facilitating the serving of just the identified one or more UEs on the particular carrier.

13. The method of claim 1, further comprising:
    updating, by the BS for each of the identified one or more UEs, a respective UE context record to indicate that the BS is serving the identified UE on the particular carrier, thereby facilitating the serving of just the identified one or more UEs on the particular carrier.

14. The method of claim 1, wherein the BS initiates operation in the lean-carrier mode responsive to detecting that bearer data has not been communicated on the particular carrier for at least a threshold time period, and wherein increasing a probability of the BS operating in the lean-carrier mode comprises increasing a probability of the BS initiating operation in the lean-carrier mode.

15. A method operable in a base station (BS) that provides service at least on a particular carrier, wherein the BS is configured to operate in a legacy mode in which the BS engages in a particular extent of reference signaling on the particular carrier, wherein the BS is also configured to operate in a lean-carrier mode in which the BS engages in a reduced extent of reference signaling on the particular carrier, wherein the reduced extent is less than the particular extent, and wherein the BS operates in the lean-carrier mode when bearer data is not being communicated on the particular carrier, the method comprising:
    of a plurality of user equipment devices (UEs) served by the BS, identifying, by the BS, a proper subset of the UEs based on the identified UEs communicating bearer data less frequently than remaining UEs of the plurality; and
    serving, by the BS, just the identified UEs on the particular carrier, thereby increasing a probability of the BS operating in the lean-carrier mode.

16. The method of claim 15, wherein the BS initiates operation in the lean-carrier mode responsive to detecting that bearer data has not been communicated on the particular carrier for at least a threshold time period, the method further comprising:
    during the serving of just the identified UEs on the particular carrier, detecting, by the BS, that bearer data has not been communicated on the particular carrier for at least the threshold time period; and
    in response to the detecting, the BS initiating operation in the lean-carrier mode.

17. A wireless communication system comprising:
    a base station (BS) that provides service at least on a particular carrier, wherein the BS is configured to operate in a legacy mode in which the BS engages in a particular extent of reference signaling on the particular carrier, wherein the BS is also configured to operate in a lean-carrier mode in which the BS engages in a reduced extent of reference signaling on the particular carrier, wherein the reduced extent is less than the particular extent, and wherein the BS operates in the lean-carrier mode when bearer data is not being communicated on the particular carrier; and
    a controller configured to carry out operations including:
        of a plurality of user equipment devices (UEs) served by the BS, identifying one or more UEs based on each of the one or more UEs communicating bearer data less frequently than a threshold frequency of bearer data communication; and
        causing the BS to serve just the identified one or more UEs on the particular carrier, thereby increasing a probability of the BS operating in the lean-carrier mode.

* * * * *